Feb. 14, 1956    R. F. ONSRUD    2,734,428
UNIVERSAL ROUTER
Filed Jan. 31, 1952    6 Sheets—Sheet 1
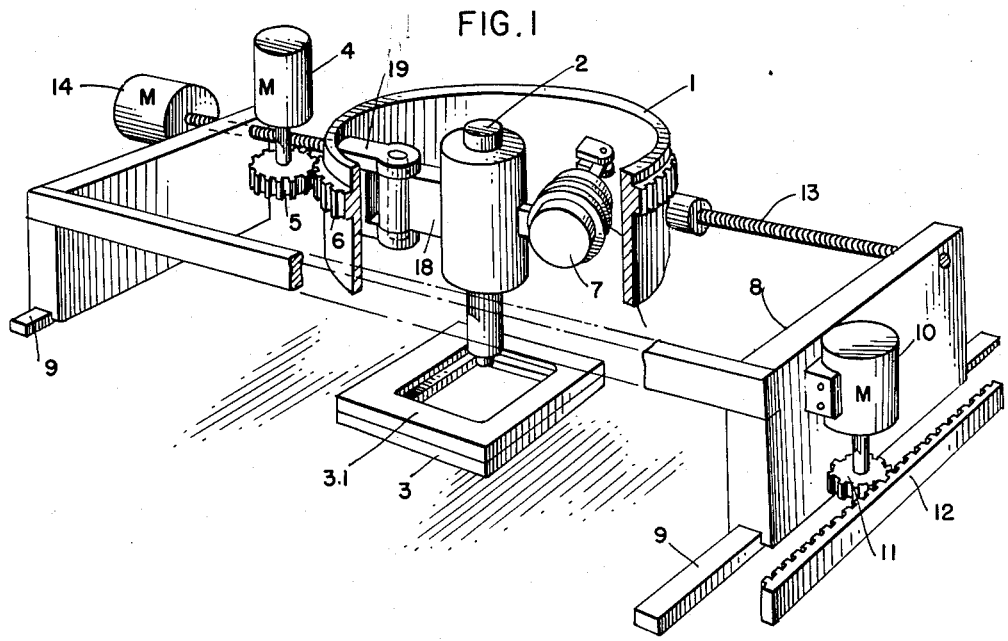
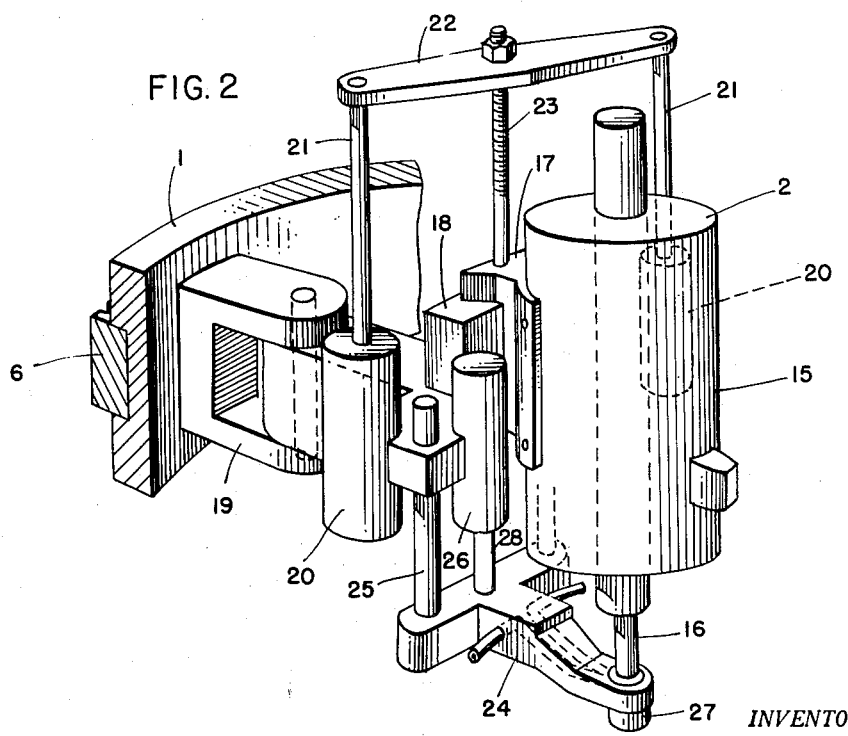
INVENTOR:
RUDOLPH F. ONSRUD
BY
Rummler, Rummler + Snow
ATT'YS

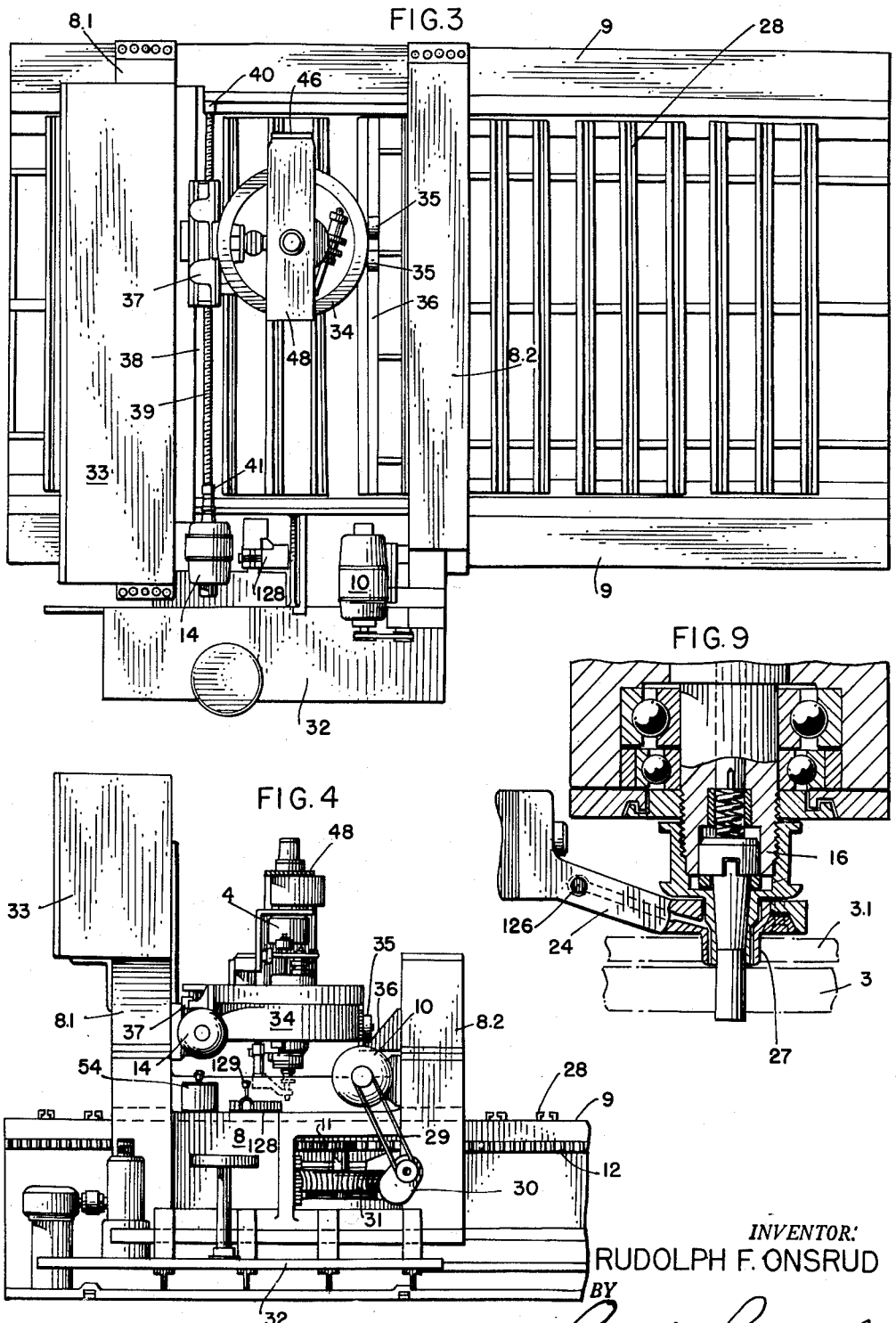

Feb. 14, 1956
R. F. ONSRUD
2,734,428
UNIVERSAL ROUTER
Filed Jan. 31, 1952
6 Sheets-Sheet 3
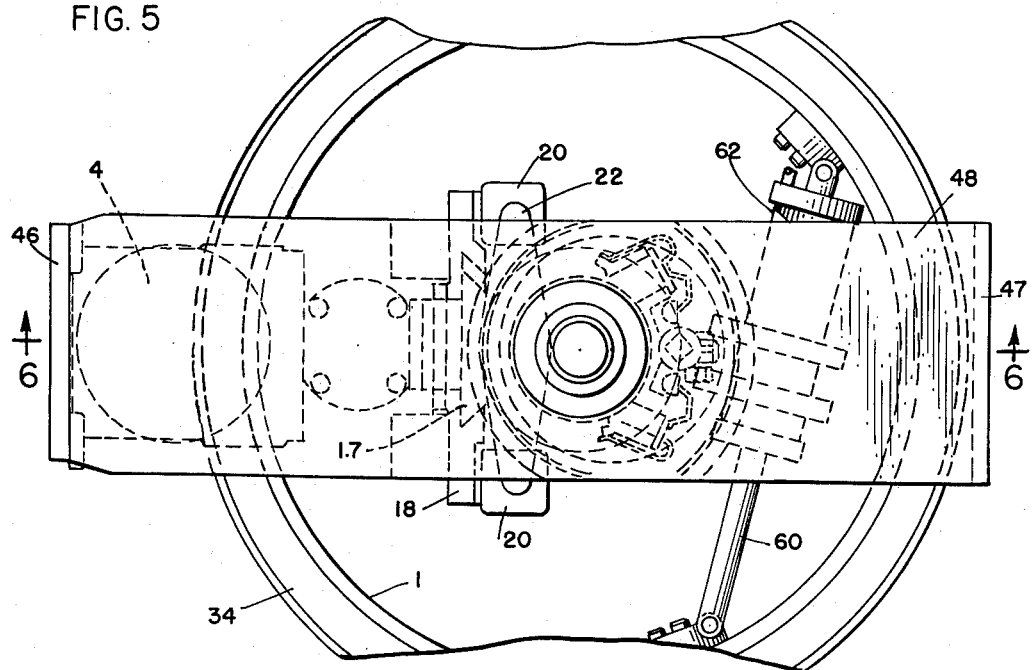
FIG. 5
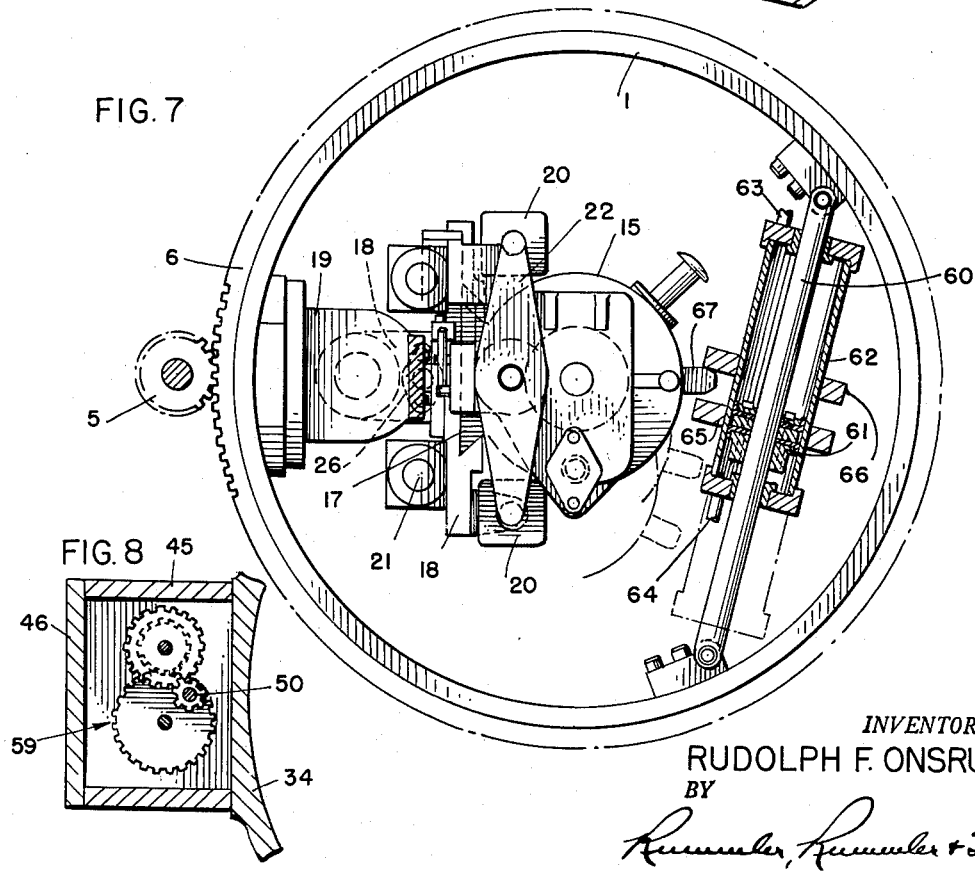
FIG. 7
FIG. 8
INVENTOR:
RUDOLPH F. ONSRUD
BY
Rummler, Rummler + Snow
ATT'YS

INVENTOR:
RUDOLPH F. ONSRUD

Feb. 14, 1956 R. F. ONSRUD 2,734,428
UNIVERSAL ROUTER
Filed Jan. 31, 1952 6 Sheets-Sheet 5
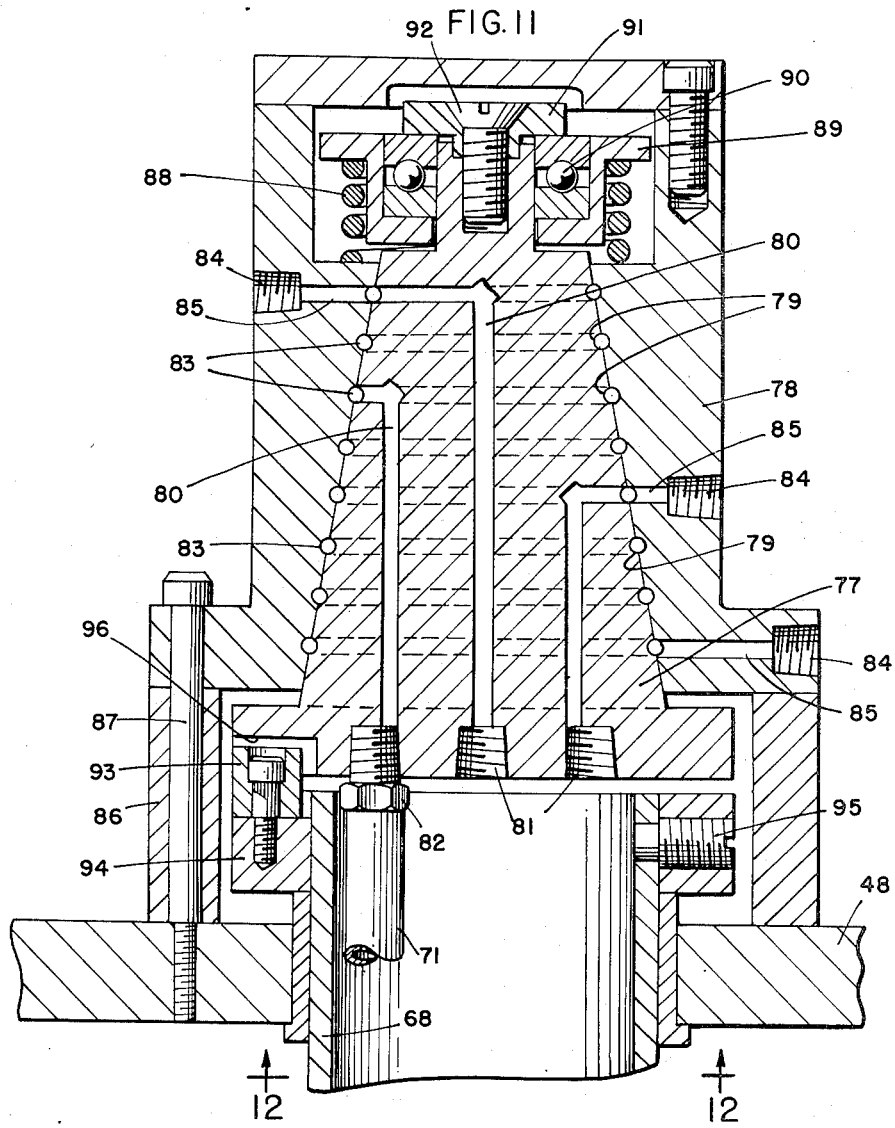
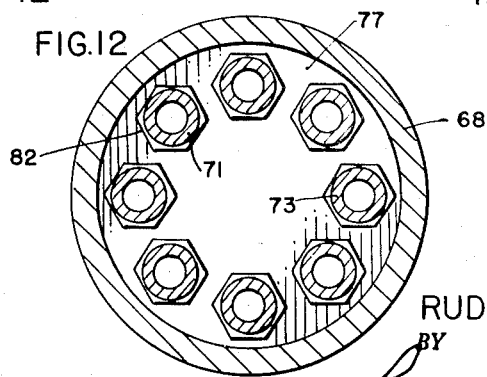
INVENTOR:
RUDOLPH F. ONSRUD
BY
ATT'YS

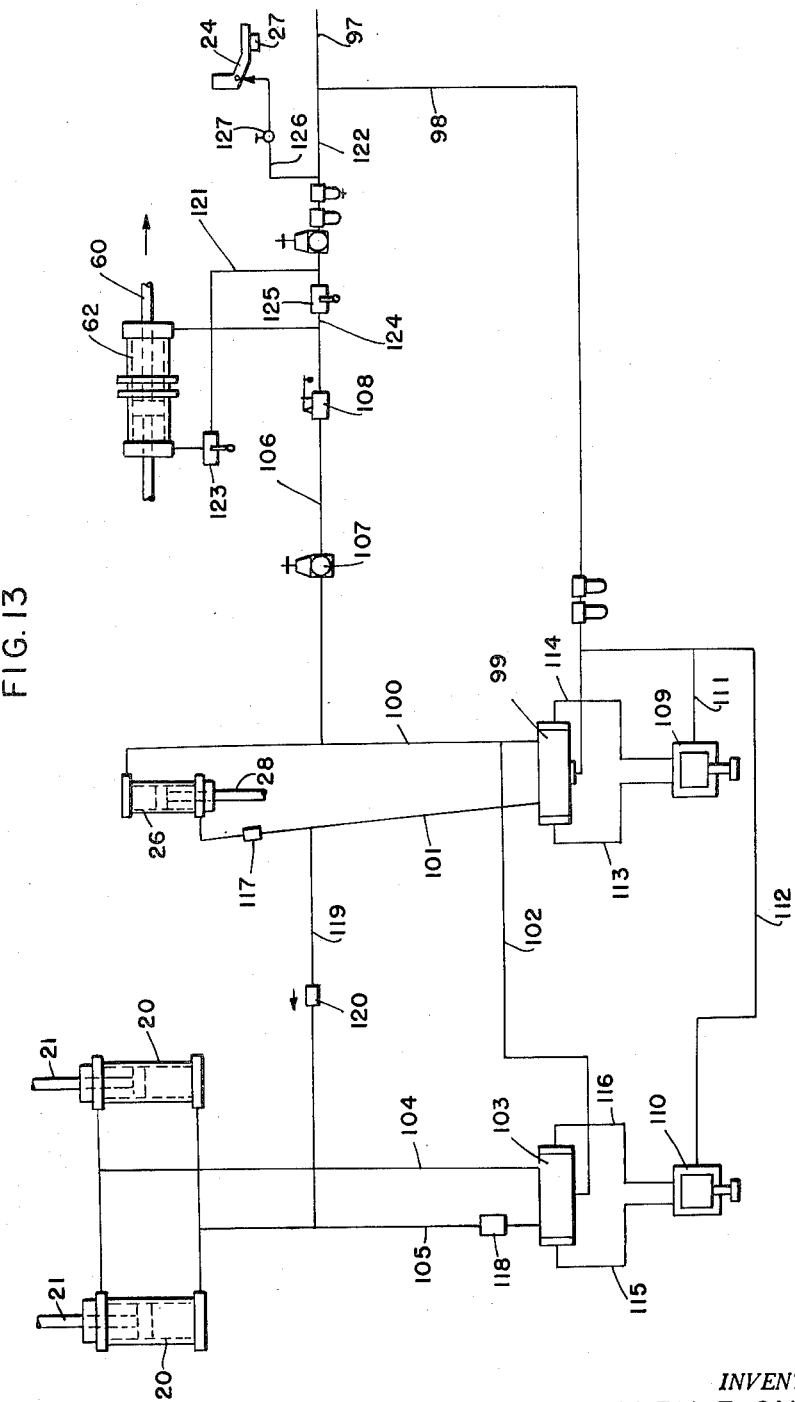

United States Patent Office 2,734,428
Patented Feb. 14, 1956

2,734,428
UNIVERSAL ROUTER

Rudolph F. Onsrud, Chicago, Ill., assignor to Onsrud Machine Works, Inc., Chicago, Ill., a corporation of Illinois Application January 31, 1952, Serial No. 269,170

19 Claims. (Cl. 90—15)

This invention relates to routing machines and particularly to high speed, power feed routers capable of working over large work table areas.

The main objects of this invention are to provide an improved router capable of power feed operation in every direction in the plane of a work piece held in a fixed position; to provide a universal routing machine; to provide such a device capable of movement, as a unit, in every direction parallel with the plane of the work piece; to provide such a device having continuous automatic work engagement during the movement in any direction; to provide such a device capable of remote control for all of its operative movements; and to provide a universal router having a power drive for each of its operative movements.

Other principal objects of this invention are to provide an improved heavy duty routing machine; to provide an improved radial arm router unit; to provide an improved mounting and operating means for heavy duty routers; to provide an improved traveling routing machine; and to provide an improved routing machine capable of remotely controlled operation over the entire surface of work tables of substantially any size.

A specific embodiment of this invention is shown in the accompanying drawings in which:

Figure 1 is a schematic perspective view showing the operating relationship of the primary elements of the improved routing machine.

Fig. 2 is a schematic perspective view showing the relationship of the power means associated with the cutting element for effecting its operation to engage and disengage the work.

Fig. 3 is a top plan view of the improved routing machine showing the relation of the traveling router unit with respect to a fixed work table or bed.

Fig. 4 is an elevational side view of the same.

Fig. 5 is a top plan view of the improved universal router unit with parts broken away and with router support member turned 90° from the position shown in Figs. 3 and 4.

Fig. 7 is a plan view of the same, partly in section, as taken on line 7—7 of Fig. 6.

Fig. 8 is a fragmentary sectional view taken on line 8—8 of Fig. 6 to show the gear train by which operation of the router unit turning motor is controlled by a Selsyn system.

Fig. 9 is a fragmentary sectional view, taken parallel with the cutter spindle axis, showing details of the pattern follower for guiding the cutter in its engagement with the work.

Fig. 11 is a vertical-section elevational view showing a power distributor head for the router unit.

Fig. 12 is a bottom plan view of the same, as taken from line 12—12 of Fig. 11, showing the arrangement of the conduit connections, and Fig. 13 is a diagrammatic view showing the fluid pressure circuit for controlling the operation of the cutter in its movement into and out of engagement with the work.

Figure 6:
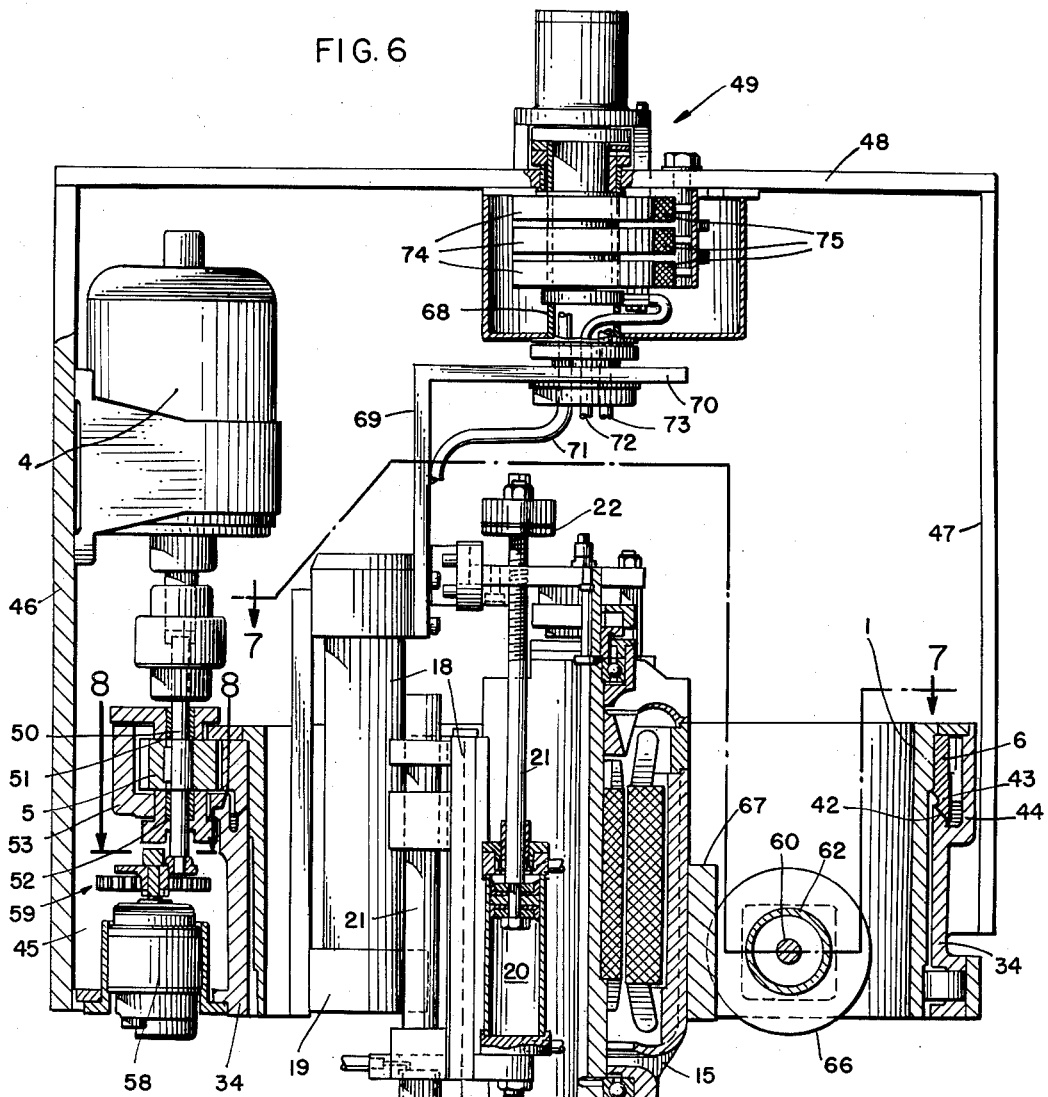
Fig. 6 is a sectional view of the same as taken on line 6—6 of Fig. 5.

In the form shown in the drawings, and as particularly demonstrated by the schematic views of Figs. 1 and 2, the primary components of my improved routing machine comprise a rotatable support member 1 on which a motor driven routing tool 2 is mounted for shifting movement laterally with respect to the rotation axis of the support 1, the axis of the tool, or of the cutter spindle, being parallel with the axis of the support member and the cutter projecting axially beyond the support for engaging the work 3 which is suitably held on a work table. Rotation of the support 1, in either direction, is obtained by means of a reversible motor 4 having a driving pinion 5 meshed with a suitable ring gear 6 secured fast to the support 1; and lateral shifting of the routing tool 2, with respect to the axis of the support, is obtained by a suitably connected fluid pressure cylinder 7 which in turn is carried by the support 1.

The routing tool support member 1, together with its turning motor 4, is mounted on a carriage 8 which in turn is mounted to slide on ways 9 disposed on each side of the work table, and the carrnage 8 is driven back and forth along the ways 9 by means of a carriage drive motor 10 which has a driving gear 11 meshed with a rack 12, suitably fixed with respect to the work table and extending lengthwise thereof. Also the support 1 is mounted to travel lengthwise of the carriage 8, transversely of the work table, or work bed, and is driven in either direction by a screw 13 operated by a reversible motor 14, the screw having suitable connection for shifting the support 1, as will be later described, and being fixedly journaled in the ends of the carriage.

Thus the routing tool 2 is capable of universal operation over substantially the entire work table surface and in every direction in the plane of the work mounted on the table. Also, because of the rotatability of the routing tool support member 1 and operation of the pressure cylinder 7 to urge the routing tool laterally with respect to the support axis, the force acting on the tool for maintaining depth of cut and engagement with a pattern can be kept substantially normal to the direction of cutter travel at all times and regardless of the location over the work table where the cut is being made.

As shown in Fig. 2 the routing tool 2 is also arranged for reciprocating movement in the axial direction of the support 1, in order to enter and withdraw the cutter from the work, and is provided with an independently reciprocable pattern follower means which, through engagement with a suitable pattern 3.1, determines the contour of the cut.

In the form shown the routing tool comprises a motor 15, disposed with its shaft axis parallel with the axis of the support 1, which motor drives a cutter spindle 16 shown as an extension of the motor shaft. The motor 15 is directly mounted on a slide 17, which is also parallel with the motor shaft, and the motor and slide are mounted on a tool carrier or shiftable arm 18 which has a pivoted connection with a bracket 19 fastened to the support 1. Axial movement of the motor, on its slide connection with the tool carrier or arm 18, is obtained by means of a pair of fluid pressure cylinders 20 which are directly mounted on the arm 18 and which have piston rods 21 extending parallel with the slide and connected at their ends to a yoke 22, which in turn is connected to the slide by a center shaft 23.

The pattern follower means shown comprises a bracket arm 24, mounted on sliding guide rods 25 which extend through suitable bearings in the arm 18, and a fluid pressure actuating cylinder 26, also mounted on the arm 18, which has its piston rod 28 directly connected to the bracket arm 24. The guide rods 25 and the cylinder 26 are mounted parallel with the axis of the motor 15 and the follower arm extends at right angles toward the cutter spindle 16 where it carries an annular collar 27 which concentrically surrounds the cutter and projects axially beyond the bottom face of the arm 24 to provide a bearing for engagement with the edge of the pattern.

The follower means and the routing tool are thus held rigidly in constant parallel relation and are separately operable by their respective operating cylinders; the follower means being shifted by its cylinder 26 to cause the collar 27 to enter into and withdraw from the pattern 3.1; and the cutter on the spindle 16 moving axially through the collar 27, to engage and disengage from the work, upon actuation of the operating cylinders 20.

It will now be seen that the improved routing machine comprises a universally operable routing tool which may be positioned over any desired location on the surface of a work table and then, after being engaged with the pattern and the work, may be power operated by remote control in every direction parallel with the work table surface to follow the pattern contour, regardless of where it may lead over the work table area; the routing tool being at all times urged in a direction normal to the control surface of the pattern through the action of the pressure cylinder 7 and appropriate turning of the routing tool support 1.

A physical embodiment of this invention, as constructed for the power feed routing of large plates, such as aircraft skin sections, is shown in Figs. 3 and 4 wherein the carriage 8 comprises a pair of spaced and rigidly connected inverted U-shaped end members 8.1 and 8.2 each designed to straddle a work table or bed 28 and to ride on the longitudinal slideways 9 provided at each side of the work bed. The spaced end members bridge the work bed so as to amply clear any work mounted thereon and between them carry the router mechanism which operates transversely of the work bed.

As shown the carriage is driven by the motor 10, mounted at one side of the end member 8.2, which is connected by a belt or chain 29 to a gear box 30 containing a worm having driving connection with the worm gear 31 mounted in the side frame structure which rigidly interconnects the end members 8.1 and 8.2. The shaft which carries the worm gear 31 also carries the driving gear or pinion 11 which meshes with the rack 12 fixedly mounted on the side of the work bed structure. The motor 10 is a reversible, variable speed, direct current, amplidyne controlled unit capable of driving the carriage in either direction along the work table or bed 28.

The carriage may also be provided with a control platform 32, mounted at one side, on which all controls for the routing machine may be carried and on which the machine operator may ride. Also, to avoid a multiplicity of power connections to the machine, a control cabinet 33, containing all electric control and power conversion devices for the several motors included in the machine, is mounted on the carriage end member 8.1. Thus the carriage is a complete self contained unit, operable over the entire length of the work bed or at any point therealong, which may require only a single cable for electric power supply. Ordinarily the work bed is made in sections of predetermined length, for example 15 feet, and as many bed sections as may be desired can be connected end to end without limitation of the operability of the carriage assembly.

In the form shown the routing tool and its rotatable support are mounted in an annular frame or shell 34, which is disposed a predetermined distance above the work table, between the carriage end members, and which is supported by and arranged to travel on suitable ways extending lengthwise of the carriage end members. On the side adjacent the carriage end member 8.2, the frame or shell 34 is provided with a pair of rollers 35 suitably journaled on stub-shafts mounted on and projecting laterally from the shell. These rollers ride on a trackway 36 carried by the end member 8.2 and laterally overhanging the work bed. On the opposite side, the frame or shell 34 is provided with a combination slide and drive bracket 37 which rides on a slideway 38 attached to and projecting inwardly from the carriage end member 8.1. The frame 34 is thus wholly supported on the ways 36 and 38 and is shiftable therealong from side to side of the work table surface.

The drive for the routing tool frame or shell 34 comprises a screw shaft 39, which is the same as the element 13 in Fig. 1, extending lengthwise of the carriage end member 8.1, parallel with the surface of the work table and journaled in suitable end bearings 40 and 41; and the motor 14, which is mounted directly on the end member 8.1 and coupled to the adjacent end of the screw shaft 39. The screw shaft 39 extends through the drive bracket 37 and is provided with a suitable threaded connection therewith so that, upon rotation of the screw, the frame or shell 34 will be caused to travel on the ways 36 and 38 according to the direction of rotation of the screw. The motor 14 is a variable speed, direct current, amplidyne controlled unit adapted to drive the frame 34 at any speed between zero and a predetermined maximum, as in the case of the carriage drive motor 10, and the control circuit, which is not shown, includes the usual limit switches, also not shown, which will automatically stop the motor 14 when the frame 34 reaches the ends of its predetermined length of travel on the ways 36—38.

Details of the universal routing tool are shown in Figs. 5, 6 and 7. Referring particularly to Fig. 6, it will be seen that the rotatable support member 1 for the router tool is an annular ring-like member which telescopingly fits into the frame 34. The side wall of the frame 34 fits the wall of the support 1 for the major portion of the depth of the frame. However, adjacent its upper end, the frame diameter is increased to provide an axially facing shoulder 42 which, as seen in Fig. 6, has an outwardly and downwardly inclined conical surface to provide a slideway on which the support ring may rest, the support ring having the ring gear 6 secured to its outer periphery adjacent its upper margin and the ring gear 6 having a downwardly projecting portion 43 which is provided with a conical end surface adapted to mate with and rest upon the conical shoulder 42. The annular support 1 is thus wholly carried by the shoulder 42 on the frame 34.

The frame 34 is also provided with an annular channel 44, which surrounds the shoulder 42, and which serves as a reservoir for lubricant to lubricate the sliding surfaces between the shoulder 42 and the lower end 43 of the ring gear 6.

As shown in Fig. 6, the support frame 34 is provided at one side with an integral, rectangular boss-like gear box 45 which houses the driving pinion 5, for turning the support member 1 in the frame 34, and which also houses a control device for regulating the motor 4 which will be hereafter described. Also the frame 34 carries an upwardly extending bridge structure which comprises a pair of uprights 46 and 47 rigidly attached to the frame 34 and which in turn support a transverse member 48 which diametrically bridges or spans the rotatable support ring above the routing tool 2. The upright 46 is directly and rigidly mounted on the outer side of the gear box 45, serving as an outside closure for the same as shown in Fig. 8, and the upright 47 is directly attached to the outside of the frame 34 on the side diametrically opposite the gear box 45.

The transverse or bridging member 48 supports a distributor assembly 49 which is directly alined with the axis of rotation of the support ring 1 and which functions to supply electric power, fluid pressure and lubricant to the routing tool carried by the support ring 1.

The motor 4 which drives or turns the support ring 1 in the frame 34 is mounted directly on the upright member 46 above the gear box 45 and is coupled directly to a shaft 50 on which the driving pinion 5 is carried, the shaft 50 being journaled in suitable bearings 51 and 52 which in turn are mounted in a support structure 53 integrally formed with and on the inside of the gear box 45. The location of the shaft 50 in the gear box 45 is such that the drive pinion 5 will be held in meshed engagement with the ring gear 6 on the outer periphery of the support ring 1, the drive pinion 5 projecting through a suitable opening formed in the side wall of the frame 34 within the gear box 45.

The motor 4 for rotating the router support ring is a variable speed, direct current, amplidyne controlled motor having infinite speeds from zero to a predetermined maximum and is operated by a Selsyn system, whereby the angular or turning movement of the support ring 1, as it is driven by the motor 4, can be precisely regulated.

Figure 10:
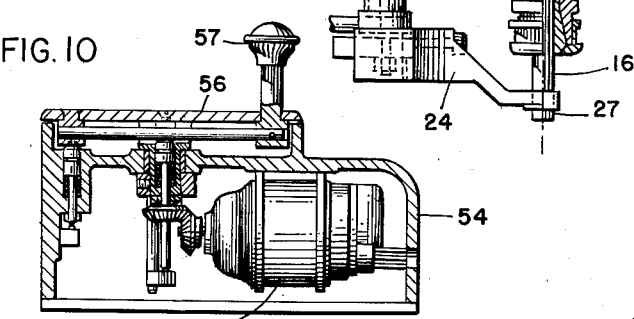
Fig. 10 is a sectional view showing a Selsyn controller for the turning drive of the routing unit support member.

A drum-type controller 54, which may be used for operating the motor 4, is shown in Fig. 10 and this controller contains a Selsyn generator or transmitter 55 which is directly driven by a rotatable hand wheel 56 having a handle 57 for its operation.

The Selsyn transmitter 55 is electrically connected, through the amplidyne motor control means, not shown, with a Selsyn receiver 58 which is mounted in the gear housing 45 on the side of the frame 34; and the Selsyn receiver 58 is connected by suitable gearing 59 to the drive shaft 50 which operates the driving gear 5 for the rotatable support ring, the gearing 59 being arranged so that the angular movement of the Selsyn receiver 58 as it is driven by the shaft 50 of the motor 4 will be exactly the same as the angular movement imparted to the rotatable support ring 1.

Thus, any angular movement of the rotor of the Selsyn transmitter 55 under the action of the hand wheel 56 will produce a voltage output from the transmitter 55 of a value directly proportional to the angular displacement of the transmitter rotor with respect to the rotor of the receiver 58, which voltage output is used, through a phase discriminator embodied in the amplidyne control means not shown, to produce a direct current voltage having a polarity that is determined by the direction that the rotor of the Selsyn transmitter is turned. This direct current voltage, which is proportional to the voltage output of the transmitter 55, is in turn used to control the amplidyne controller circuit for the motor 4 so that the motor 4 will operate in the appropriate direction until the Selsyn receiver 58 has been turned to the same angular displacement as the transmitter 55.

In this manner the rotatable support ring is caused to be turned by the motor 4 through exactly the same angular distance that the Selsyn transmitter is turned by the hand wheel 56 and the angular movement of the support ring will be in exact accordance with the angular movement of the hand wheel 56.

The Selsyn instruments 55 and 58 and the amplidyne controller for regulating the operation of the motor 4, as well as their electrical interconnections, are well known in the art and since the equipment can be readily purchased on the open market, further details of its construction and operation are unnecessary.

Referring particularly to Figs. 5, 6 and 7, it will be seen that, in the form shown, the routing tool motor is mounted on the radial arm or tool carrier 18 so that its axis is swingable in an arc, about the center of the pivot connection with the bracket 19, which intersects the axis of rotation of the support ring 1; and that the fluid pressure means, for shifting the routing tool laterally in its support, is arranged to swing the entire routing tool assembly along the said arc. Thus the routing tool is a complete unit operable independently of rotation or transportation of the support ring and its range is limited only by the internal dimensions of the support ring and the length of the radial arm 18.

The fluid pressure means for shifting the routing tool laterally, within its support ring, comprises, in the form shown, a fixed piston shaft 60, secured at both ends on the inside of the support ring 1 and having a stationary piston 61 mounted at substantially the middle of the shaft length. A cylinder 62, closed at both ends, is slidably mounted on the shaft 60, over the piston 61, and is fitted to the piston so that it may be driven in either direction by fluid pressure supplied at one end or the other through suitable conduits 63 and 64 opening into respective ends of the cylinder 62.

As shown, driving engagement of the cylinder 62 with the routing tool is obtained by a pair of spaced ribs or flanges 65 and 66 secured fast on the cylinder wall and projecting radially therefrom to engage, between them, a gear tooth 67 which is integral on and projects radially from the motor housing of the routing tool. Thus any shifting of the cylinder 62 along the fixed piston shaft 60 will cause swinging movement of the routing tool, as indicated by the dotted outlines shown in Fig. 7, and because the cylinder is ordinarily operated by compressed air, the actuating force is yieldable to permit automatic shifting of the routing tool along its arc of movement in accordance with variations in the pattern contour.

As before mentioned, the power supply for operation of the routing tool is obtained through the distributer assembly 49 which is mounted on the bridge member 48 directly above and axially alined with the routing tool upport ring 1. As shown the distributer assembly is in two sections, one for supplying fluid pressure and lubricant and one for supplying electrical power for the router motor, and the two sections are alined one above the other on a common operating shaft 68 which in turn is secured at one end to a turning bracket 69. The bracket 69 is mounted directly on the routing tool pivot bracket 19, which revolves with the support ring 1, and has a portion 70 which projects radially inward to overhang the center of the support ring. It is the portion 70 which carries the distributer operating shaft 68, and the operating shaft is thus rotated with the support ring whenever the latter is turned.

The operating shaft 68 is a hollow member, as shown, and the several electrical leads and fluid conduits which lead from the distributer assembly pass through the bottom of the operating shaft, as indicated at 71, 72 and 73 in Fig. 6, and thence to the routing tool assembly. Thus, no matter how the support ring is turned, the leads and conduits travel with it and twisting or tangling of the leads and conduits is obviated.

As shown in Fig. 6, the electrical section of the distributer assembly is located below the bridge member 48 and comprises a plurality of collector rings 74, mounted in axially spaced relation on the operating shaft 68, and each collector ring is provided with a lead which runs into the operating shaft and through the bottom end thereof to a suitable connection, not shown, with the routing tool motor 15. In the present instance three collector rings are shown, for three-phase current, and although but one lead 72 is shown it will be understood that a similar lead is provided for connection of each ring with the motor 15. Electrical power is fed to the collector rings 74 by means of suitable brushes 75, having connections, not shown, with a source of suitable current supply; and the entire electrical distributor section is enclosed in a protective housing 76 mounted on the bridge member 48.

The fluid pressure and lubricant distributing section is mounted above the bridge member 48 and in the form shown comprises a valve cone or core member 77, mounted on the shaft 68 for rotation therewith, and a housing or valve body 78 which is secured fast to the upper surface of the bridge member 48. The conical core member 77 is ground for a sliding, air and liquid tight, fit with the interior of the valve body 78, which is also conical and the two parts are lapped together to provide the necessary perfection of contact and fit between the meeting surfaces.

As shown, the core member 77 is provided with a series of axially spaced peripheral grooves 79, each of which is connected by drilled passages 80 with a respective pipe tap 81 in the bottom end of the cone or core member, the pipe tap 81 in each case being threaded to receive a coupling 82 for connection with a conduit, as indicated at 71 in Fig. 11. The valve body 78 is likewise provided with a series of axially spaced annular grooves 83 in its inner surface, which grooves are located to mate with the groove 79 in the cone when the cone and valve body are in running engagement with each other. Each of the grooves 83 is connected to a pipe tap 84 in the outside wall of the valve body 78, by means of a drilled passage 85. In this manner, constant communication between the conduits, such as 71, connected to the bottom end of the valve cone or core member 77, and suitable conduits connected to the pipe taps 84 in the valve body, is provided and such communication is continuous regardless of the relative turning or rotation of the core member 77 with respect to the valve body 78.

As shown in Fig. 11, the valve body 78 is mounted on a spacer ring 86 in order to provide space, between the upper surface of the bridge member 84 and the bottom of the valve body 78, for the coupling of the cone or core member 77 with the upper end of the rotating hollow operating shaft 68, the valve body 78 being secured to the bridge member by means of stay bolts 87. Also, the cone or core member 77 is held in tight running engagement in the valve body 78 by means of a compression spring 88, which bears upwardly between the valve body and a collar 89, which in turn engages the bottom race of an axial thrust bearing 90. The upper race of the thrust bearing 90 is held on the upper end of the cone or core member 77 by means of a washer 91 secured to the cone member by a screw 92.

Driving connection between the operating shaft 68 and the valve cone 77 is obtained by means of a lug 93 mounted on a suitable collar 94, which is attached to the operating shaft by means of a set screw 95, the lug 93 engaging in a notch 96 formed in the bottom surface of the valve cone.

In the form shown there are eight separate passages through the valve body for supplying fluid pressure and lubricant to the routing tool assembly, and the disposition of the eight passages is indicated by the end view shown in Fig. 12. Of these eight passages, three pairs are utilized for supplying fluid pressure to and from the routing tool elevating cylinders 20, the follower operating cylinder 26 and the routing tool shifting cylinder 62 respectively. The two remaining passages are utilized respectively for supplying lubricant and compressed air to the follower bracket 24 for the purpose of lubricating the cutter and blowing away chips during the cutting operation.

The schematic diagram of Fig. 13 illustrates the fluid pressure circuit by which the router tool operating cylinders 20, 26 and 62 are actuated and controlled. In the present instance the operating fluid is compressed air and is supplied at a pressure of 100 pounds per square inch through a main supply line 97 leading from a suitable compressor and reservoir, not shown. A branch 98 leads from the main line to a pneumatically operated master valve 99 and thence by leads 100 and 101 to respective ends of the follower actuating cylinder 26. The lead 100 supplies pressure to extend the piston rod 28 and lower the follower into the pattern and the lead 101 serves to raise the follower by a reverse movement of the piston rod 28.

As shown, a connection 102 runs from the lead 100 to a second master valve 103 which, through leads 104 and 105, controls the operation of the elevating cylinders 20 to lower and raise the routing tool or cutter relative to the work. Also a second connection 106 runs from the lead 100, through a pressure regulator 107 and a blow-off valve 108, to the forward end of the lateral motion cylinder 62.

The master valves 99 and 103 are each of the well-known type in which the direction of air flow from the valve is controlled by a reciprocable piston which is air actuated, and each master valve is individually controlled by an operating valve 109 and 110, respectively. The operating valves 109 and 110 are four-way valves which receive air by branch lines 111 and 112, respectively, leading from the main air supply branch line 98, and this operating air is delivered by each operating valve to the opposite ends of its respective master valve through the leads 113—114 and 115—116.

As shown the leads 101 and 105, which run to the bottom ends of the cylinders 26 and 20 respectively, for raising the follower and cutter from the work, are provided with flow control valves 117 and 118, respectively, which permit full air flow toward the cylinder but restrict the flow from the cylinder in order to cushion the downward movement of the respective pistons. Also a cross-connection 119 is provided between the leads 101 and 105 for causing simultaneous lifting action of the cutter elevating cylinders 20 whenever the follower cylinder 26 is actuated to raise the follower 24 from the pattern. A one-way flow control valve 120 is provided in the cross-connection 119 to allow air flow only in the direction from lead 101 to lead 105 and thus prevent lifting operation of cylinder 26 when raising of the cutter alone, by its cylinders 20, is desired.

In order to afford full pressure reversing action of the lateral motion cylinder 62, a lead 121 is run from the rearward end of the cylinder 62 to the main line 97 by way of a second branch line 122; and a three-way hand valve 123 is provided in the lead 121 for its control. Also a connection 124, including a two-way valve 125, is provided between the lead 121 and the connection 106 to the line 100. The purpose of the connection 124 and its valve 125 is to permit application of full line pressure on each side of the cylinder 62 to hold it at a fixed intermediate position in case that may be desired.

Air for chip removal, is also supplied to the follower 24 from the line 122, by way of a lead 126, and the air volume is controlled by a hand cock 127.

It will now be understood that the three pairs of air lines 100—101, 104—105 and 106—121, together with the air line 126, are all led from the main line and its branches to the distributer valve housing 78 where they are connected to respective pipe taps 84; and that distribution of the air flow to the respective cylinders 20, 26 and 62, and to the follower 24, is provided by the rotary valve core 77 and the conduits leading therefrom through the hollow operating shaft 68.

In the operation of the improved universal routing machine, longitudinal and transverse motion of the router with respect to the work bed 28 is obtained by the motors 10 and 14, which are controlled through the control panel 33 by a single universal controller, indicated by the number 128 in Figs. 3 and 4, and adapted to control the motors 10 and 14 either individually or simultaneously and in either direction. The controller 128 is arranged to be actuated in all of its operations by a single lever 129, which may be operated with one hand and is thus in the nature of a joy-stick. Rotation of the router support ring 1 by means of the motor 4 is controlled by the operator's other hand through the Selsyn controller 54. Thus the operator, by using his two hands, can cause the universal router to move longitudinally of the work bed 28, and transversely of the work bed, either separately or simultaneously, and can at the same time control the position of the router cutter through rotation of the router support ring, thereby at all times controlling the location of the cutter with respect to the entire surface of the work bed and the direction of the cutter movement.

The operation of the cutter motor 15 is controlled by the usual start and stop buttons, not shown, and the operation of the router unit, to cause it to raise and lower with respect to the work and cause engagement of the follower 27 and the cutting tool with the pattern and the work respectively, is controlled by the fluid pressure circuit shown in Fig. 13.

In the operation of the fluid pressure circuit, the main control valves 109 and 110 are preferably foot operated valves so that they may be actuated by the operator without his having to remove his hands from the electrical controllers 54 and 128. With compressed air supplied at adequate pressure through the supply line 97, and assuming that the routing unit has been moved to proper position over the work, which is clamped to the work bed 28, the follower shoe 24, which carries the follower 27, is first lowered to engage the pattern by operation of the foot valve 109, which pneumatically actuates the master valve 99 so that air is supplied from the branch line 98, through the lead 100 to the top of the follower cylinder 26. When the follower has been lowered to engage the pattern, the cutter, together with its motor 15, is lowered so as to engage the work by operation of the foot valve 110, which in turn actuates the master valve 103 to cause air to be supplied from the connection 102 through the lead 104 to the top ends of the cylinders 20. Since the air supply for the cylinders 20 is delivered by the connection 102 from the lead 100, it is necessary that the foot valve 109 be actuated first. This assures that the follower will be in position to engage the pattern before the cutter can be lowered to engage the work.

Operation of the master valve 99 by the foot valve 109 to lower the follower, simultaneously causes air to flow to the forward end of the lateral motion cylinder 62, which air under the control of the pressure regulator 107 is at reduced pressure with respect to the pressure applied to the cylinder 26. This results in the lateral motion cylinder 62 operating at a slower rate than the follower cylinder 26, and causes lateral engagement of the follower 27 with the pattern when it has reached its lowered position. The routing tool is now in position for operation and with the follower being held continuously in engagement with the pattern by the lateral motion cylinder 62, all further movement of the cutter with respect to the work is under the control of the cutter positioning motors 4, 10 and 14.

With the follower in lowered position and in engagement with the pattern, the cutter may be raised or lowered independently of the follower by operation of the foot valve 110, the raising of the cutter being accomplished through the shifting of the master valve 103 to direct the air supply through the lead 105 to the bottom ends of the cutter cylinders 20. When it is desired to disengage the routing tool from the work operation of the foot valve 109 to shift the master valve 99 so as to direct the air supply through the lead 101 to the bottom end of the follower cylinder 26 will cause the follower to raise; and, through the connection 119 between the leads 101 and 105, will simultaneously cause elevation of the cutter by supplying air to the lower end of the cutter cylinder 20. Thus with the two foot control valves 109 and 110, the operator has substantially complete control of the elevation of the routing tool with respect to the work held on the work table 28.

In case it should be desired to hold the follower away from the pattern by reverse action of the lateral motion cylinder 62, this can be accomplished by means of the valve 123 which, when in opened position will allow full line pressure to be applied from the lead 121 to the rearward end of the cylinder 62; and in the event that this reverse motion of the cylinder 62 will produce excessive pressure at the forward end of the cylinder, such excessive pressure will be automatically relieved by the blow-off valve 108. Also, in the event that it is desired to hold the lateral motion cylinder 62 in an intermediate position, this can be accomplished by opening the valve 125 in the connection 124, whereby full line pressure from the supply line 97 may be applied to the forward end of the cylinder to exactly balance the line pressure admitted to the rear end of the cylinder through the valve 123. The valves 123 and 125 are ordinarily not used during cutting operation of the router machine, and these valves are therefore hand operated valves which may be manipulated by the operator when he is not controlling the electrically powered movement of the machine.

It will be understood that suitable adjustable limit stops, not shown, may be provided to limit the extent of movement of both the follower and the cutter upon entering the work, or to regulate the length of stroke of these components under the action of their respective fluid pressure cylinders. Also suitable stops, not shown, may be provided to limit the movement of the lateral motion cylinder 62. This is a common practice and such stops may have any suitable arrangement. For that reason such stops have not been illustrated or described in detail herein.

The main advantages of this invention reside in the universal movement and the universal control of the movement of the cutter tool with respect to the work bed, whereby substantially any type of routing operation, and particularly heavy duty routing, may be performed on large relatively heavy sheets or pieces; in the fact that the routing unit may be kept in constant, proper relation with the template or pattern regardless of the direction or path of cutter movement as the follower moves along the template contour; and in the fact that lateral movement of the routing tool for continuous engagement of the follower with the pattern is wholly automatic during all movements of the cutter with respect to the work.

Other advantages reside in the precisely controlled rotatability of the router unit in its support frame, whereby the direction of pressure engagement of the follower with the pattern can be maintained substantially normal to the line of pattern contour regardless of the direction of cutter movement; in the fact that power feed of the cutter is had for every direction of cutter movement over the work table bed thereby permitting heavy duty routing at high speed; and in the fact that the universal movement of the routing tool over the entire surface of the work table bed is limited only by the length and width of the work table on which the routing machine is mounted.

Although but one specific embodiment of this invention is herein shown and described, it will be understood that numerous details of the construction shown may be altered or omitted without departing from the spirit of this invention as defined by the following claims.

I claim:

1. A routing machine comprising a rotatable support, a rotatable cutter spindle mounted on said support for shifting movement laterally with respect to the rotation axis of said support, motor means for driving said spindle, resiliently yieldable means on said support for continuously urging said spindle laterally relative to the support axis, and means for turning said support on its axis independently of the operation of said resiliently yieldable means.

2. A routing machine comprising a rotatable support, a rotatable cutter spindle carried by said support and disposed substantially parallel with the rotation axis thereof, said spindle being mounted on said support for shifting movement thereon both axially and laterally with respect to the rotation axis thereof, motor means for driving said spindle, means for shifting said spindle in either axial direction, fluid pressure means for yieldably urging said spindle laterally with respect to the support axis, and drive means for turning said support in either direction on its rotation axis independently of the last-named means.

3. A routing machine comprising a rotatable support, a rotatable cutter spindle carried by said support and disposed substantially parallel with the rotation axis thereof, said spindle being mounted on said support for shifting movement both axially and laterally with respect to the rotation axis thereof, motor means for driving said spindle, means for shifting said spindle in either axial direction, an annular follower concentrically surrounding said spindle in fixed radial relation therewith and mounted for independent shifting movement along the axis of said spindle, means for shifting said follower axially independently of any axial shifting of said spindle, and resilient pressure means on said support for yieldably urging said spindle and said follower simultaneously in a lateral direction with respect to the rotation axis of said support.

4. A routing machine comprising a rotatable support, a shiftable tool carrier mounted on said support for lateral movement with respect to the rotation axis of the support, a rotatable cutter spindle mounted on said tool carrier, motor means for driving said spindle, fluid pressure means on said support for constantly and yieldably urging said tool carrier laterally outward with reference to the support axis, and reversible driving means for turning said support on its axis independently of the operation of said fluid pressure means.

5. A routing machine comprising a rotatable support, a shiftable tool carrier mounted on said support for lateral movement with respect to the rotation axis of the support, a rotatable cutter spindle mounted on said tool carrier for shifting movement in the direction of the spindle axis, said spindle being disposed substantially parallel with the axis of said support, motor means for driving said spindle, remotely controlled reversible fluid pressure means for shifting said spindle axially, fluid pressure means on said support for continuously and yieldably urging said tool carrier laterally with reference to the support axis during the operation of the machine, and reversible driving means for turning said support on its axis.

6. A routing machine comprising a rotatable support, a shiftable tool carrier mounted on said support for lateral movement with respect to the rotation axis of the support, a rotatable cutter spindle mounted on said tool carrier for shifting movement in the direction of the spindle axis, said spindle being disposed substantially parallel with the axis of said support, motor means for driving said spindle, reversible fluid pressure means on said tool carrier for shifting said spindle axially, an annular follower concentrically surrounding said spindle and mounted on said carrier for independent shifting movement along the axis of said spindle, means for shifting said follower axially independently of any axial movement of said spindle, said follower having fixed relation with said spindle for lateral movement with said tool carrier, and resilient pressure means mounted on said support for yieldably urging said tool carrier laterally relative to the support axis and independently of the operation of said spindle and follower means.

7. A routing machine comprising a tool carrier mounted for movement parallel with a common plane, a cutter spindle on said tool carrier mounted with its axis substantially normal to said common plane and for shifting movement along its axis, a follower concentrically surrounding said cutter spindle and mounted on said carrier and with respect to said spindle for independent movement axially thereof, fluid pressure means for shifting said follower along the cutter spindle axis, and independently operable fluid pressure means on said tool carrier for axially shifting said cutter spindle independently of said follower.

8. A routing machine comprising a tool carrier mounted for movement parallel with a common plane, a cutter spindle on said tool carrier mounted with its axis substantially normal to said common plane and for shifting movement along its axis, a follower concentrically surrounding said cutter spindle and mounted with respect thereto for independent movement axially thereof, said follower having fixed concentric relation with said spindle for simultaneous lateral movement therewith upon movement of said tool carrier, fluid pressure means for shifting said follower along the cutter spindle axis, and independently operable fluid pressure means on said tool carrier for axially shifting said cutter spindle.

9. A universal routing machine comprising a work bed, a carriage extending transversely of the work bed and mounted for movement longitudinally thereof, a frame mounted on said carriage and movable thereon in the transverse direction of said work bed, motor means for independently operating said carriage and frame, a routing tool mounted on said frame and having a rotatable power driven cutter disposed with its axis substantially normal to the plane of said work bed, means for mounting said routing tool for angular shifting movement relative to said frame, motor means for shifting said routing tool angularly independently of and simultaneously with movement of said frame and of said carriage, and independent power means for shifting said cutter axially.

10. A universal routing machine comprising a work bed, a carriage extending transversely of the work bed and mounted for movement longitudinally thereof, a frame mounted on said carriage and movable thereon in the transverse direction of said work bed, a support member mounted on said frame for rotation on an axis substantially normal to the plane of said work bed, a routing tool mounted on said support member for lateral shifting movement relative to the axis of rotation thereof, said routing tool comprising a rotatable power driven cutter having its axis substantially normal to said work bed, motor means for turning said support member on its axis, and fluid pressure means for normally urging said routing tool to shift laterally relative to the support axis.

11. A routing machine comprising a work bed, a frame movable parallel with the surface of said work bed, a tool carrier supported by said frame and mounted for shifting movement relative thereto in a plane parallel with said work bed, a routing tool mounted on said tool carrier and having a rotatable power driven cutter disposed with its axis substantially normal to said work bed, said routing tool having sliding connection with said tool carrier for shifting movement in the direction of the cutter axis, remotely controlled fluid pressure means for shifting said routing tool in the direction of the cutter axis, and independent resilient pressure means for normally urging shifting movement of said tool carrier relative to said frame.

12. A routing machine comprising a work bed, a frame spaced a predetermined distance from and movable parallel with the surface of said work bed, a support member mounted on said frame for rotation on an axis substantially normal to said work bed, remotely controlled motor means for turning said support member on its axis, a routing tool mounted on said support member for independent shifting movement relative thereto in a plane parallel with said work bed, and means for normally urging said routing tool to shift laterally with respect to the axis of said support member, said routing tool having a rotatable power driven cutter disposed with its axis normal to the surface of said work bed.

13. A routing machine comprising a work bed, a frame spaced a predetermined distance from and movable parallel with the surface of said work bed, a support member mounted on said frame for rotation on an axis substantially normal to said work bed, remotely controlled motor means for turning said support member on its axis independently of movement of said frame, a routing tool mounted on said support member for independent shifting movement relative thereto in a plane parallel with said work bed, means for normally urging said routing tool to shift laterally with respect to the support member, and independent remotely operable means for shifting said routing tool axially, said routing tool having a rotatable power driven cutter disposed with its axis normal to the surface of said work bed.

14. A routing machine comprising a frame movable parallel with a common plane, a support member mounted on said frame for rotation relative thereto on an axis substantially normal to said common plane, a tool carrier mounted on said support member for lateral movement relative to the axis thereof in a direction parallel with said common plane, a routing tool mounted on said tool carrier and having a power driven cutter spindle disposed with its axis substantially normal to said common plane, motor means for turning said support member on its axis, and resilient pressure means for normally urging said tool carrier to shift laterally relative to the support member axis.

15. A routing machine comprising a frame movable parallel with a common plane, a support member mounted on said frame for rotation relative thereto on an axis substantially normal to said common plane, a tool carrier mounted on said support member for movement relative to the axis thereof in a direction parallel with said common plane, a routing tool mounted on said tool carrier and having a power driven cutter spindle disposed with its axis substantially normal to said common plane, reversible remotely controlled power means for moving said cutter spindle in the direction of its axis, motor means for turning said support member on its axis, and resilient pressure means for normally urging said tool carrier to shift laterally relative to the support member axis.

16. A routing machine comprising a tool carrier mounted for movement parallel with a common plane, a cutter spindle on said tool carrier mounted with its axis substantially normal to said common plane and for shifting movement along its axis, a follower concentrically surrounding said cutter spindle in radially spaced relation therewith and mounted with respect thereto for independent movement axially thereof, fluid pressure means for shifting said follower along the cutter spindle axis, independently operable fluid pressure means on said tool carrier for axially shifting said cutter spindle, and control means for actuating the last-named means operable only upon axial movement of said follower toward said common plane.

17. A routing machine comprising a tool carrier mounted for movement parallel with a common plane, a cutter spindle on said tool carrier mounted with its axis substantially normal to said common plane and for shifting movement along its axis, a follower concentrically surrounding said cutter spindle in radially spaced relation therewith and mounted with respect thereto for independent movement axially thereof, said follower having fixed concentric relation with said spindle for simultaneous lateral movement therewith upon movement of said tool carrier, remotely controlled means for shifting said follower along the cutter spindle axis, independently operable remotely controlled means on said tool carrier for axially shifting said cutter spindle, and control means for limiting the operation of the last-named means until said follower has been actuated axially towards said common plane.

18. A routing machine comprising a work bed, a frame extending over said work bed, a support member mounted on said frame for rotation on an axis substantially normal to said work bed, remotely controlled motor means for turning said support member on its axis, a routing tool mounted on said support member for independent shifting movement relative thereto in a plane parallel with said work bed, and resiliently yieldable means for normally urging said routing tool to shift laterally with respect to the axis of the said support member during operation of said machine, said routing tool having a rotatable power driven cutter disposed with its axis normal with the surface of said work bed.

19. A routing machine comprising a work bed element and a frame element extending across said work bed element in spaced relation therewith, one of said elements being movable relative to the other in a direction parallel with the plane of said work bed element, a support member mounted on said frame element for rotation relative thereto on an axis substantially normal to the plane of said work bed element, a tool carrier mounted on said support member for lateral movement relative to the axis thereof in a direction parallel with the plane of said work bed element, a routing tool mounted on said tool carrier and having a power driven cutter spindle disposed with its axis substantially normal to the plane of said work bed element, motor means for turning said support member on its axis, and resiliently yieldable pressure means for normally urging said tool carrier to shift laterally relative to the support member axis during operation of the machine.

References Cited in the file of this patent

UNITED STATES PATENTS

| | | |
|---|---|---|
| 1,237,487 | Dickie | Aug. 21, 1917 |
| 2,026,659 | Siebenthaler | Jan. 7, 1936 |
| 2,069,299 | Bartholomew | Feb. 2, 1937 |
| 2,116,248 | Moser | May 3, 1938 |
| 2,163,345 | McMahon et al. | June 20, 1939 |
| 2,188,447 | Smith | Jan. 30, 1940 |
| 2,195,108 | Graff | Mar. 26, 1940 |
| 2,252,112 | Bailey | Aug. 12, 1941 |
| 2,445,903 | Bentzman | July 27, 1948 |
| 2,479,588 | Dixon | Aug. 23, 1949 |
| 2,507,982 | Krause | May 16, 1950 |
| 2,569,238 | Harber | Sept. 25, 1951 |
| 2,596,867 | Richards | May 13, 1952 |

FOREIGN PATENTS

| | | |
|---|---|---|
| 609,357 | Germany | Jan. 24, 1935 |